United States Patent
Duhault et al.

[11] Patent Number: 5,900,868
[45] Date of Patent: May 4, 1999

[54] METHOD AND APPARATUS FOR MULTIPLE CHANNEL DISPLAY

[75] Inventors: James Duhault, Etobicoke; Angela Neill, Toronto, both of Canada

[73] Assignee: ATI International, St. Kitts/Nevis

[21] Appl. No.: 08/831,072

[22] Filed: Apr. 1, 1997

[51] Int. Cl.[6] .................................................. H04N 5/445
[52] U.S. Cl. .......................... 345/327; 348/564; 348/565
[58] Field of Search ................................. 348/563, 564, 348/565, 731, 734, 906, 7, 12, 13; 345/327, 127, 342, 145, 146, 157, 158, 507, 522, 508; H04N 5/44, 5/445, 7/16, 7/173

[56] References Cited

U.S. PATENT DOCUMENTS

| | | | |
|---|---|---|---|
| 3,736,377 | 5/1973 | Warren, Jr. et al. | 348/564 |
| 4,905,077 | 2/1990 | Ishii | 348/564 |
| 4,914,516 | 4/1990 | Duffield | 358/183 |
| 4,984,082 | 1/1991 | Okamura | 348/565 |
| 4,998,171 | 3/1991 | Kim et al. | 348/564 |
| 5,093,726 | 3/1992 | Chun | 358/183 |
| 5,144,438 | 9/1992 | Kim | 348/565 |
| 5,146,335 | 9/1992 | Kim et al. | 348/564 |
| 5,161,019 | 11/1992 | Emmanuel | 348/565 |
| 5,170,256 | 12/1992 | Tabata | 348/564 |
| 5,194,954 | 3/1993 | Duffield | 358/193.1 |
| 5,343,250 | 8/1994 | Iwamura | 348/564 |
| 5,365,276 | 11/1994 | Imai et al. | 348/564 |
| 5,442,398 | 8/1995 | Koshiro et al. | 348/564 |
| 5,537,152 | 7/1996 | Ishikawa | 348/564 |
| 5,717,468 | 2/1998 | Baryla | 348/563 |

*Primary Examiner*—Nathan Flynn
*Attorney, Agent, or Firm*—Markison & Reckamp

[57] ABSTRACT

A method and apparatus that automatically scales the channel display area (i.e., thumbnails of the channels) based on the number of channels and displaying characteristics and that provides the user with options to customize the plurality of channels displayed in the multi-channel display is accomplished by determining whether all of the channels in the user's customized list can be displayed within the given display area, which may be the full screen or a portion thereof. If all of the channels can be displayed in the given display area, another determination is made to determine the size of each of channel display areas (i.e., thumbnail). Having made this determination, visual representations of each channel in the user's customized list is displayed. While the multi-channel display is being presented, the user can select one of them for customized editing.

20 Claims, 6 Drawing Sheets

METHOD AND APPARATUS FOR MULTIPLE CHANNEL DISPLAY

FIELD OF THE INVENTION

The present invention relates generally to computers and more particularly to displaying a plurality of channels on a computer, where the channels may be, but are not limited to, television broadcast channels, cable broadcast channels, or satellite broadcast channels.

BACKGROUND OF THE INVENTION

Computers are arguably one of the greatest technical accomplishments of mankind. They provide man with an ever increasing source of information, data manipulation capabilities, convenience, and entertainment. Computer entertainment has many forms, including computer games, interactive multimedia presentations, and, more recently, broadcast television.

To receive a television broadcast, a computer needs to be equipped with a tuner. Depending on the type of tuner employed, the computer may receive traditional radio frequency (RF) broadcast television channels, cable broadcast channels, or satellite broadcast channels. In addition, the tuner may be able to receive radio broadcasts. By adjusting the tuner, a channel is selected and subsequently processed and displayed on the computer screen, monitor, or provided to a television.

Due to the processing power of a computer, the computer can provide a wide variety of services that a regular television cannot. For example, if the television broadcast has associated closed caption, the computer can record the closed caption data, along with video images of the broadcast, and store it as a word document. In addition, the computer can sample many television channels and provide a fixed number of these samples, i.e., still shots, on the computer screen at one time. Such multiple channel display may be used to select which channel to view. When the selection is made, the channel selected fills the computer screen.

While the multiple channel display allows the user to select which channel to view, it provides only a fixed number of channels for viewing and once a channel is selected, it fills the computer screen. As such, if the user does not want to view the selected channel, s/he must reinitiate the fixed multi-channel display. Further, because the number of channels is fixed, the user is not allowed to customize the number of channels viewed, or which channels to include in the multi-channel display.

Therefore, a need exists for a computer system that allows a user to customize a multi-channel display to meet his/her personal needs.

DETAILED DESCRIPTION OF THE DRAWINGS

Generally, the present invention provides a method and apparatus that automatically scales the channel display area of a plurality of channels (i.e., thumbnails of the channels) based on the number of channels being displayed and displaying characteristics. The method and apparatus further provide the user with options to customize the plurality of channels displayed in the multi-channel display. This is accomplished by determining whether all of the channels in the user's customized list can be displayed within the given display area, which may be the full screen or a portion thereof. If all of the channels can be displayed in the given display area, another determination is made to determine the size of each of the channel display areas (i.e., the still video thumbnails). Having made this determination, visual representations of each channel in the user's customized list is displayed in the scaled channel display areas. While the multi-channel display is being presented, the user can select one of them for customized editing. With such a method and apparatus, a user can now select which channels to include in his or her customized list and have any number of them displayed in a multi-channel display. The user is further provided with the flexibility of performing customized editing of the video thumbnails in the multi-channel display.

Figure 1:
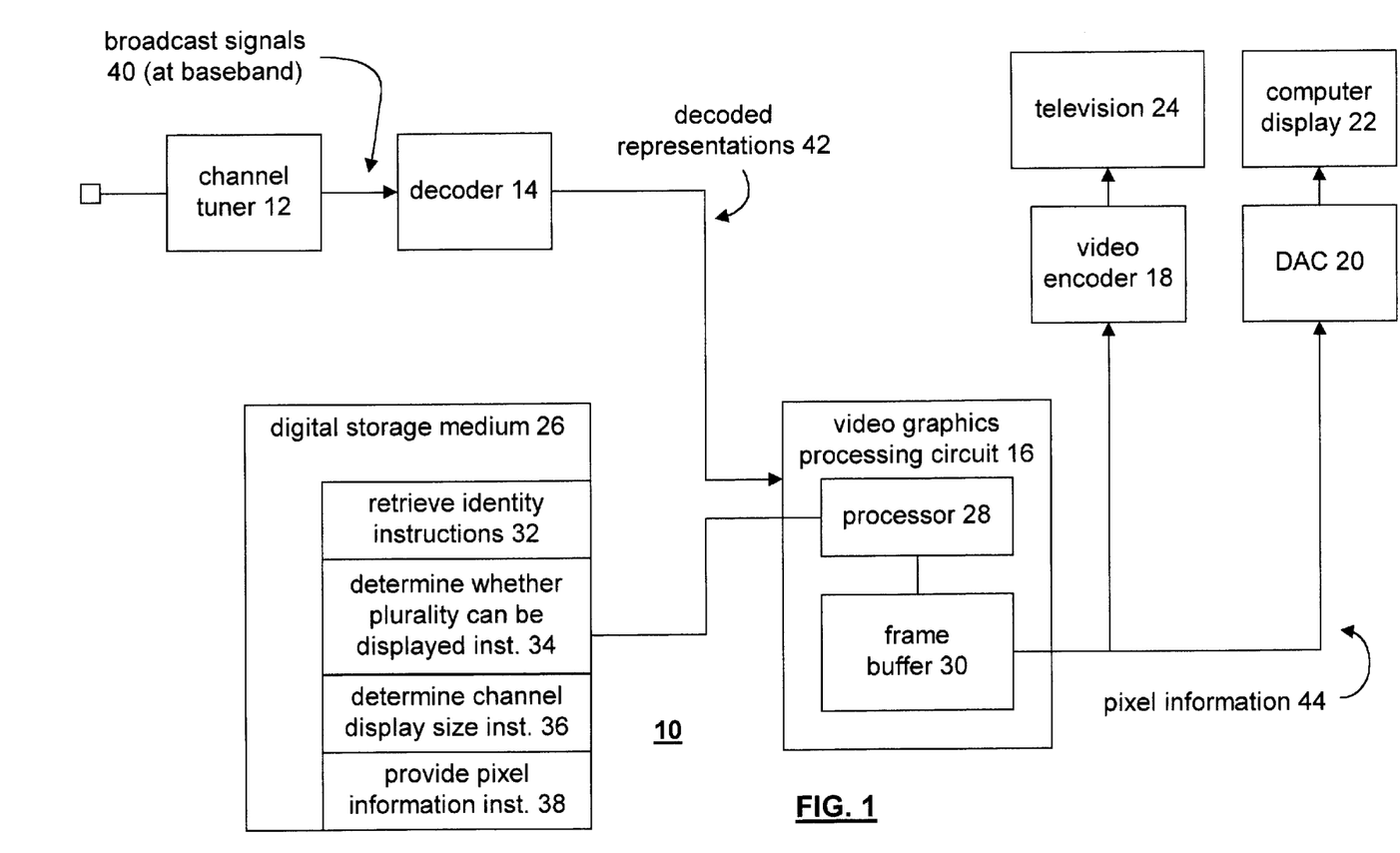
FIG. 1 illustrates a schematic block diagram of a multi-channel display which is in accordance with the present invention.

The present invention can be more fully described with reference to FIGS. 1–6. FIG. 1 illustrates a schematic block diagram of a multi-channel display 10 which includes a channel tuner 12, a decoder 14, a video graphics processing circuit 16, a video encoder 18, a digital to analog converter (DAC) 20, and a digital storage medium 26. The DAC 20 provides analog representations of pixel information 44 to a computer display 22, while the video encoder 18 provides encoded representations of the pixel information 44 to a television.

The video graphics circuit 16 includes a processor 28 and a frame buffer 30. The frame buffer 30 may be RAM that stores the pixel information 44 in two read/write stages. The first read/write stage is in a read mode as it supplies the pixel information to the DAC 20 and the video encoder 18, while the second stage is in a write mode as it is storing new pixel information from the processor 28. The processor 28, which may be a microprocessor, a microcontroller, a digital signal processor (DSP), a minicomputer, any device that manipulates digital information based on programming instructions, or any combination thereof, processing data based on operational instructions stored within a video graphics memory (not shown), the computer's system memory (not shown), and/or the digital storage medium 26.

The digital storage medium 26, which may be RAM, ROM, EPROM, EEPROM, or any device that stores digital information, stores programming instructions that, when read by the processor 28, causes the processor 28 to implement the user customized multi-channel display. In particular, the digital storage medium 26 stores programming instructions which cause the processor 28 to retrieve identity of a plurality of channels 32; determine whether the plurality of channels can be displayed within a display area based on size of the display area, number of channels in the plurality of channels, and displaying characteristics 34;

when the plurality of channels can be displayed within the display area, determine channel display size for each of the plurality of channels based on the displaying characteristics, the size of the display area, and the number of channels 36; and provide visual representations of each of the plurality of channels in accordance with the channel display size such that the visual representations of each of the plurality of channels may be displayed on a single display 38.

In operation, the channel tuner 12 provides broadcast signals 40 to the decoder 14. Depending on the type of tuner 12, the broadcast signals 40 may be audio and/or video signals of broadcast television channels, cable television channels, satellite television channels, multi-cast mode broadcasts, or broadcast radio channels with accompanying graphical identifiers such as radio data services which indicates the radio station's name, station format (Eg.. music or talk), and the type of music it plays. In the multiple channel display mode, the tuner 12 is constantly changed, or retuned, to retrieve samples of live broadcasts of the various channels to be displayed. These live broadcast samples are sent to the decoder 14 as broadcast signals 40.

The decoder 14, which may be Brooktree BT 848 decoder, decodes the broadcast signals and provides the decoded representations 42 to the video graphics circuit 16. The video graphics circuit 16, which may be RAGE PRO from ATI, Technologies, receives the decoded representations and converts them into pixel information 44 based on the programming instructions stored in the digital storage medium 26 and subsequently produces the display as shown in FIG. 2, which may be displayed on the television 24 or the computer monitor 22.

Figure 2:
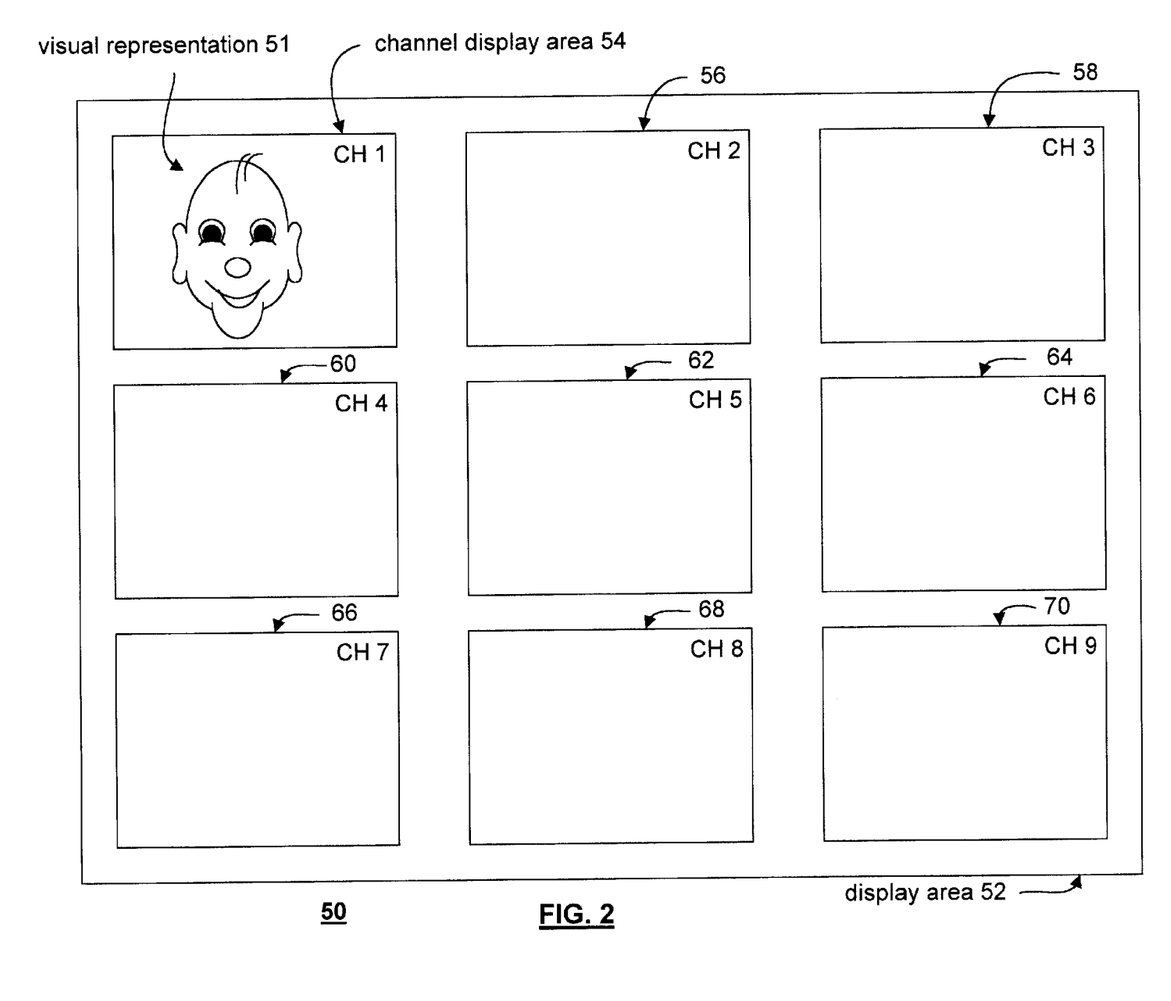
FIG. 2 illustrates a block diagram of a display area that includes a plurality of channel display areas which is in accordance with the present invention.

FIG. 2 illustrates a block diagram of a display area 52 that includes a plurality of channel display areas 54, 56, 58, 60, 62, 64, 66, 68, and 70. In each of these channel display areas a visual representation 51 of the sampled channel broadcasts received by the tuner is displayed. The size of the channel display area, which is often called a thumbnail, depends on the size of the display area 52 and the number of channels to be displayed. The present method calculates the maximum size of each thumbnail based on the size of the display area 52, the number of channels to be displayed, and displaying characteristics such as aspect ratio and minimum resolvable image size. A further discussion of this calculation will be presented below with reference to FIGS. 4–6.

The multiple channel display of FIG. 2 will remain until the user selects one of the channels for full display area viewing, selects an editing function, a preview function, scrolls to other thumbnails, or terminates the multiple channel display. While in the multiple channel display, each of the visual representations 51 will be updated or refreshed at a periodic rate. The periodic rate is primarily a function of the speed of the tuner 12 in switching from channel to channel and the number of channels.

Figure 3:
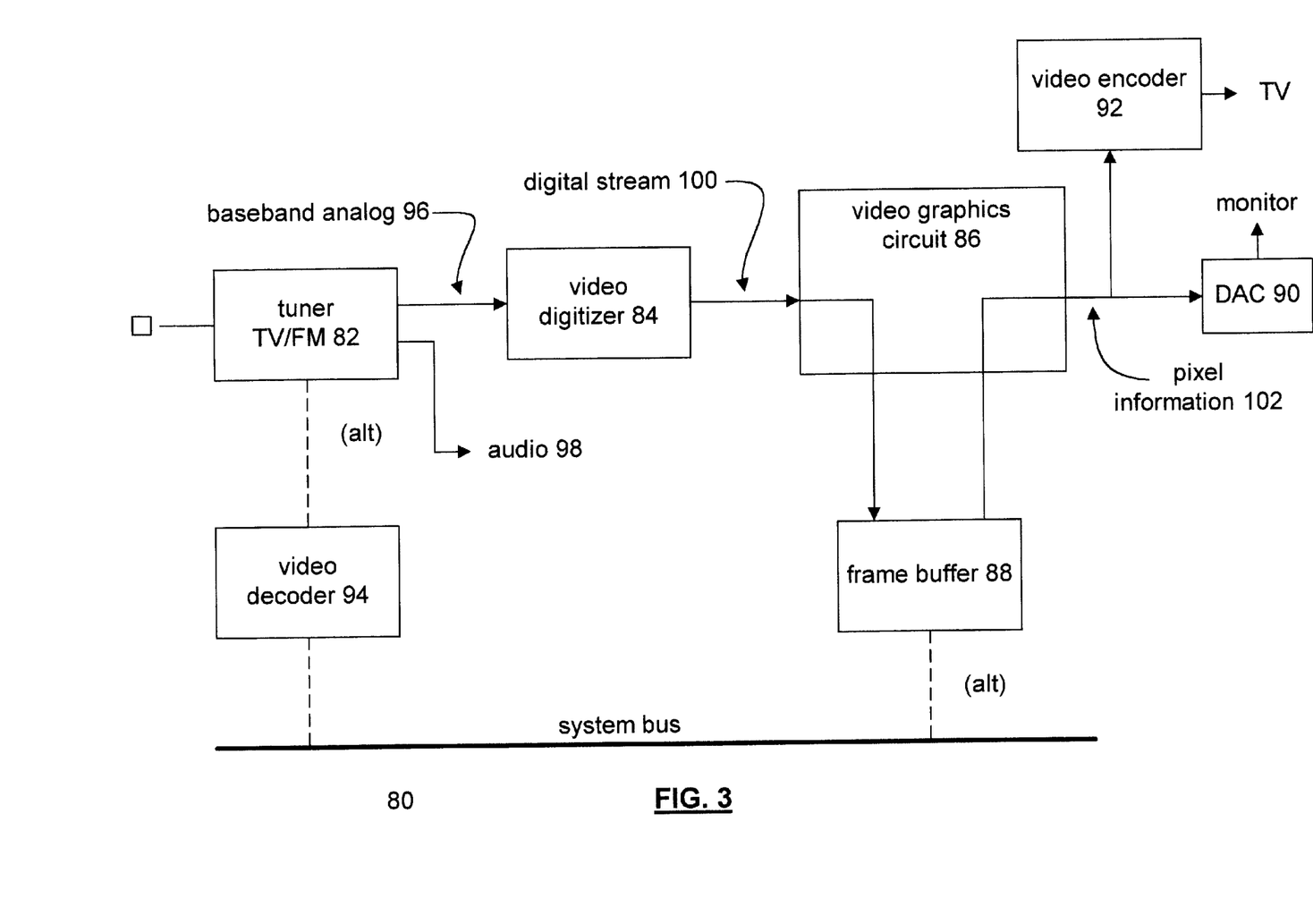
FIG. 3 illustrates a schematic block diagram of an alternate multi-channel display which is in accordance with the present invention.

FIG. 3 illustrates a schematic block diagram of an alternate multi-channel display 80 which includes a TV/FM tuner 82, a video graphics circuit 86, a frame buffer 88, a DAC 90, a video encoder 92, and a video digitizer 84 or a video decoder 94. This circuit operates very similarly to the one of FIG. 1, but includes an alternate coupling of the tuner to the video graphics circuit 86. In a first alternative, the analog video images 96 received by the tuner 82 are provided to the video digitizer 84, which may be a Brooktree BT 829 digitizer, which digitizes the images and provides a digital stream 100 to the video graphics circuit 86 over a dedicated bus. The video graphics circuit 86 processes the digital stream 100 as discussed above. The audio signals 98 received by the tuner 82 are provided to an audio processor (not shown) for processing.

In the second alternative, the signals received by the tuner 82 are provided to the video decoder 94, which may be a BT 848 decoder. The decoded signals are then provided to the system bus for routing to the frame buffer 88. In this circuit, the system bus is the system bus of a computer system operably coupled to the central processing unit, the system memory, and other peripherals of the computer system. When full video is being processed, the video decoder 94 is providing up to 25 Mbps of data to the frame buffer 88, which is a primary reason why the first alternative is a preferred coupling technique. Regardless of which path the data is received by the video graphics circuit 86, it provides pixel information 102 to the DAC 90 and the video encoder 92.

Figure 4:
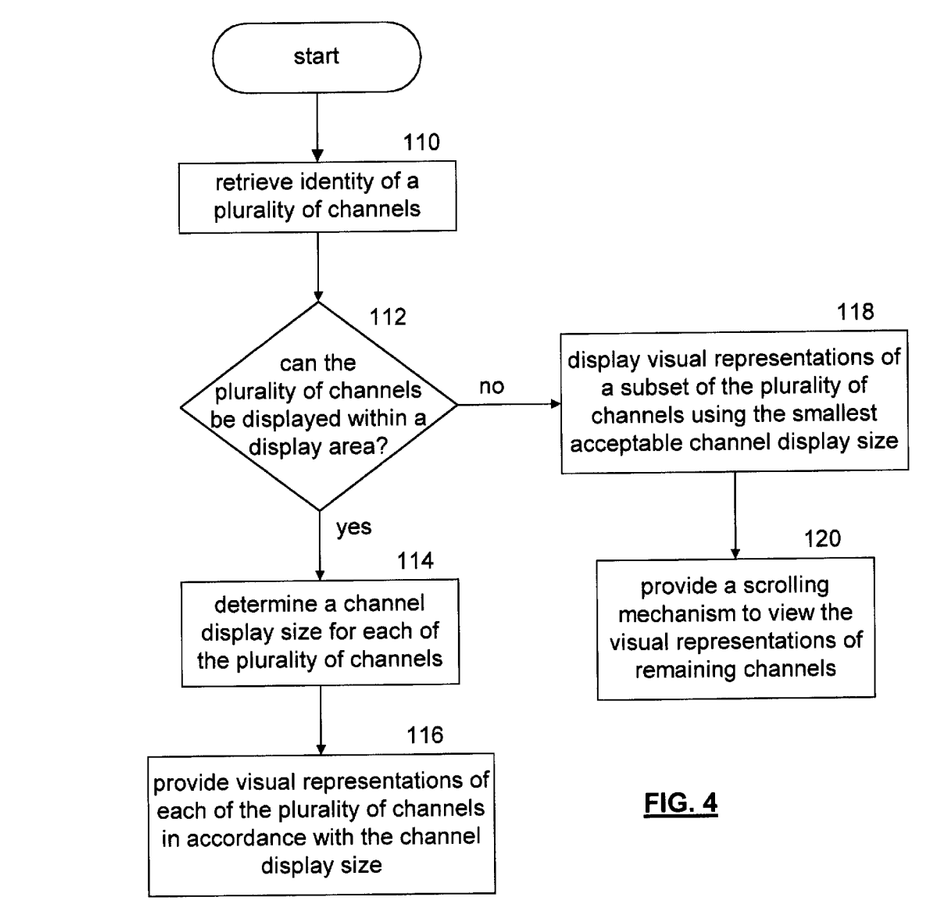
FIG. 4 illustrates a logic diagram that may be used to implement the multi-channel display in accordance with the present invention.

FIG. 4 illustrates a logic diagram that may be used to implement the multi-channel display. The process begins at step 110 where identity of a plurality of channels is retrieved. The plurality of channels may be television broadcast channels, cable broadcast channels, satellite broadcast channels, radio broadcast channels, multi-cast mode channels (i.e., from the Internet), or any combination thereof. In addition, the plurality of channels may be compiled into a list by the user or by automatic scanning of receivable channels. Regardless of how the list of the plurality of channels is compiled and the types of channels contained therein, the process proceeds to step 112, where a determination is made as to whether the plurality of channels can be displayed within the display area. Such a determination is based on the size of the display area, the number of channels in the plurality of channels, and displaying characteristics.

While there are only three factors that determine whether the plurality of channels will fit within the display area, each of these factors have several subfactors. For example, the displaying characteristics include an aspect ratio and minimum resolvable image size. The aspect ratio, which is set to avoid distortion of the images, is set by the display area of the normal displaying medium. For example, the normal aspect ratio for a television is 4×3, while the aspect ratio for a motion picture (wide screen or letterbox) is 16×9. The minimum resolvable image size may be a predetermined value, a fixed value such as 80×60 pixels, a user defined value, an automated value, or an interactive size value (i.e., the minimum size needed for user interaction). The display area may be full screen or any portion thereof. As such, there are many variables that go into making the determination of step 112.

If, the plurality of channels will not fit within the display area, the process proceeds to step 118, where visual representations of a subset of the plurality of channels are displayed using the smallest acceptable channel display size (thumbnail), which may be 80×60 pixels. The process then proceeds to step 120, where a scrolling mechanism is provided to view the visual representations of the remaining channels of the plurality of channels.

If, however, the plurality of channels will fit within the display area, the process proceeds to step 114, where the channel display area is determined based on the displaying characteristics, the size of the display area, and the number of channels. Having made this determination, the process proceeds to step 116, where the visual representations of each of the plurality of channels are displayed in accordance with the channel display area. In other words, the visual representations are displayed as thumbnails have the maximum individual size possible to fit within the display area provided.

Figure 5:
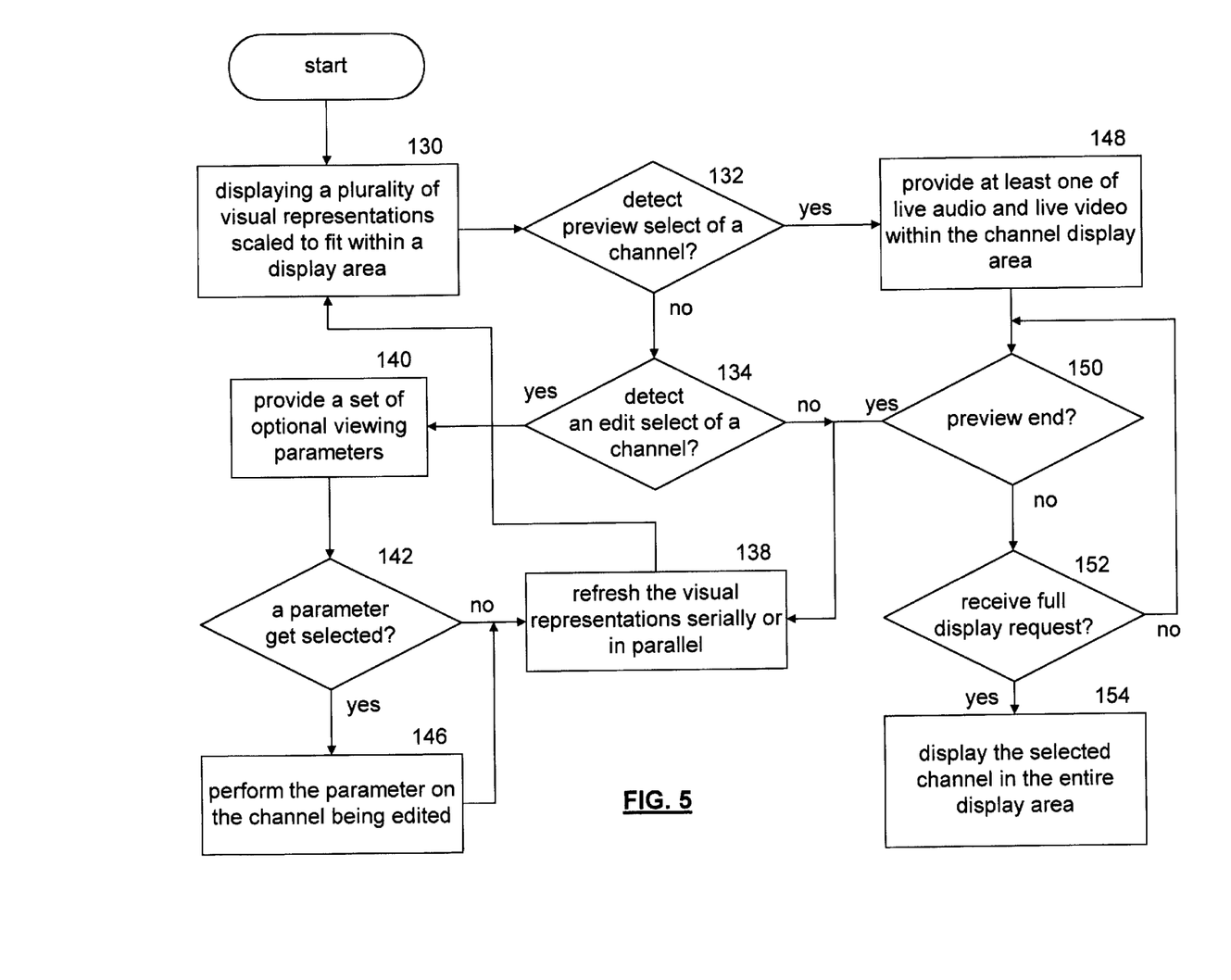
FIG. 5 illustrates a logic diagram that may be used to implement an alternate multi-channel display in accordance with the present invention.

FIG. 5 illustrates a logic diagram that may be used to implement an alternate multi-channel display. The process begins at step 130, where a plurality of channels are scaled to fit within a given display area. Such scaling is done as described above with reference to FIG. 4. With the plurality of thumbnails displayed, the process of FIG. 5 proceeds to step 132, where a determination is made as to whether a preview selection of one of the channels has been received. A preview selection may be done in a variety of ways. For example, it may be done using a mouse, a point and click cursor, a highlight cursor about the thumbnail, a keyboard entry or any other graphical or keyboard user interface technique.

If a preview selection was not detected, the process proceeds to step 134 where a determination is made as to whether an edit selection has been received. Like the preview selection, the edit selection can be done in a variety of ways, such as a right button click on a mouse, a keyboard entry, etc. If an edit selection is not detected, the process proceeds to step 138, where the visual representations of the plurality of channels are refreshed. While the refresh, or update, rate can be set by the user, it is typically dependent upon the hardware and the number of channels being sampled as discussed above with reference to FIG. 1. While the visual representations are being refreshed and displayed, the process continues to monitor for a preview selection or an edit selection.

When an edit selection is detected, the process proceeds to step 140, where a set of optional viewing parameters are provided. The optional viewing parameters, which include, but are not limited to, add/delete from the automatic generated channel list, delete from the user's customized channel list, add/delete to a lock-out list (Eg. parental control), or labeling a channel with a name, icon, text, etc. The process then proceeds to step 142, where a determination is made as to whether a parameter has been selected. If a parameter was not detected, which may be determined by a time-out period or a user directive, the process returns to refreshing the visual representations and waiting for a preview select or an edit select. If, however, a parameter was selected, the process proceeds to step 146, where the selected parameter is executed upon the selected thumbnail. Once completed, the process returns to step 138.

When a preview selection is detected, the process proceeds to step 148, where live audio and/or live video is provided for the selected thumbnail, but is done so within the channel display area. The process then proceeds to step 150, where a determination is made as to whether the preview has ended. Note that the preview may end by a directive from the user or a time out period expiring. If the previewing ends, the process returns to step 138. If, however, the previewing has not ended, the process proceeds to step 152, where a determination is made as to whether a full display area viewing option has been selected. If not, the process continues to provide the live audio and/or live video until the preview ends or full display area viewing is selected. When full display area viewing is selected, the process proceeds to step 154, where the selected channel is displayed in the entire display area.

Figure 6:
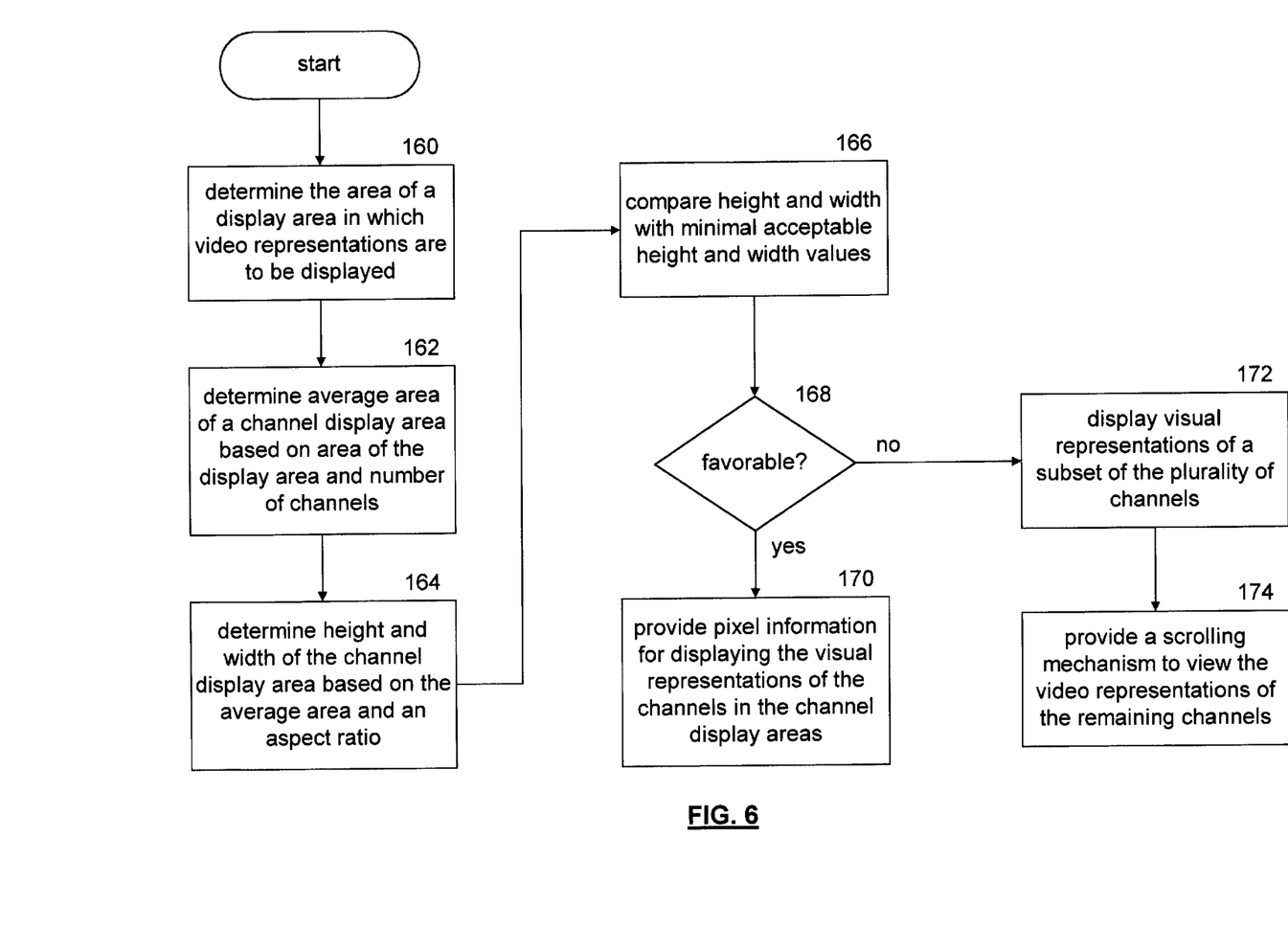
FIG. 6 illustrates a logic diagram that may be used to implement another alternate multi-channel display in accordance with the present invention.

FIG. 6 illustrates a logic diagram that may be used to implement another alternate multi-channel display. The process begins at step 160, where the area of the display area is determined, or some display area parameter based on the height and/or width of the display area. For example if the entire screen is to be the display area and it is 640×480 pixels, then the area is 640*480 which equals 307,200 sq. pixels. The process then proceeds to step 162, where a determination is made as to the average size of the channel display area is made, or some other channel display area parameter. Such a determination is made based on the area of the display area parameter and the number of channels to be displayed. Continuing with the above example, assume that 30 channels are to be displayed, thus the average area of the channel display area is 307,200/30 which equals 10,340.

The process then proceeds to step 164, where a determination is made as to the height and width of each of the channel display areas based on the average area of the channel display area and an aspect ratio. Continuing with the above example, assume that the aspect ratio is 4:3; where the average area of the channel display area equals H*W and H=3/4W, thus the area=4/3H*H. Performing a little algebra, gives the equation of H equals the square root of 4/3*(the average area of the channel display area). In this example H=85 pixels, and W=105 pixels, with each calculation having remainders. Having made these calculations, the process proceeds to step 166, where a comparison is made between the calculated height and width with minimal acceptable values for the height and width, i.e., the minimal resolvable image size. If the comparison is favorable (step 168), i.e., the calculated height and width exceed the minimums, the process proceeds to step 170, where pixel information is provided such that the visual representations of the channels may be displayed in the channel display areas, where the remainders are used to provide spacing between the channel display areas. In the example provided, the comparison would be favorable since the minimum acceptable height and width are 60 and 80 pixels respectively.

If, the comparison was unfavorable, the process proceeds to step 172, where visual representations of a subset of the plurality of channels are displayed using the smallest acceptable channel display size, which may be 80×60 pixels. The process then proceeds to step 174, where a scrolling mechanism is provided to view the visual representations of the remaining channels of the plurality of channels.

Note the preceding channel display area, or thumbnail, calculation was one of a number of possible ways to calculate the size. As one skilled in the art will readily appreciate, it is possible to treat height and width independently. Thus, a preference may be given to either height or width in order to determine the best thumbnail size. This includes any iterative methods for optimizing the thumbnail size.

The preceding discussion has described a method and apparatus for providing computer users with the ability to customize the viewing of a plurality of broadcast channels. This is generally accomplished by scaling the channel display area, i.e., video thumbnail, of the plurality of channels based on user specifications, displaying characteristics, and the display area. In addition, users are now provided with the ability to customize the list of channels being displayed in a multiple channel display format.

We claim:

1. A method for multiple channel display, the method comprising the steps of:

a) retrieving identity of a plurality of channels;

b) determining whether the plurality of channels can be displayed within a display area based on size of the display area, number of channels in the plurality of channels, and displaying characteristics;

c) when the plurality of channels can be displayed within the display area, determining channel display size for each of the plurality of channels based on the displaying characteristics, the size of the display area, and the number of channels; and d) providing visual representations of each of the plurality of channels in accordance with the channel display size such that the visual representations of each of the plurality of channels may be displayed on a single display.

2. The method of claim 1 further comprises, within steps (b) and (c), utilizing at least one of aspect ratio and minimum resolvable image size as the displaying characteristics.

3. The method of claim 2 further comprises determining the minimum resolvable image size to be one of: a predetermined value, 80×60 pixels, a user defined value, an automated value, and an interactive size value.

4. The method of claim 2 further comprising, within step (a), retrieving a plurality of television broadcast channels as the plurality of channels, wherein the plurality of television broadcast channels may be received by a tuner as at least one of: RF broadcast television, cable broadcast television, satellite broadcast television, and a multi-cast mode broadcast.

5. The method of claim 4 further comprises the steps of:

detecting preview selection of one of the plurality of channels; and providing at least one of live audio and live video of the one of the plurality of channels within a corresponding channel display.

6. The method of claim 5 further comprises providing the at least one of the live audio and the live video for a predetermined duration, a user defined duration, or until a termination signal is received.

7. The method of claim 6 further comprises, when the predetermined duration or the user defined duration ends or the termination signal is received, returning to updating the visual representations of the plurality of channels.

8. The method of claim 6 further comprises, prior to the predetermined duration or the user defined duration ending or receiving the termination signal, selecting the one of the plurality of channels for full display area viewing.

9. The method of claim 1 further comprises:

detecting an editing selection of one of the plurality of channels;

providing a set of optional viewing parameters;

detecting selection of a parameter of the set of optional viewing parameters; and performing the parameter upon the visual representation of the one of the plurality of channels.

10. The method of claim 9 further comprises selecting one of: an add/delete from a channel list, delete the one of the plurality of channels from the plurality of channels, add/delete to a lock-out list, or labeling the one of the plurality of channels as the parameter.

11. The method of claim 1 further comprises, within step (a), retrieving a plurality of radio broadcasts, which include graphical identifiers, as the plurality of channels.

12. The method of claim 1 further comprises, within step (b), determining the display area to be one of: full screen or a window.

13. The method of claim 1 further comprises, within step (a), establishing the plurality of channels by one of: automatic scanning of receivable channels and receiving channel selections from a user.

14. The method of claim 1 further comprises, when the plurality of channels cannot be displayed within the display area, displaying the visual representations of a subset of the plurality of channels using smallest channel display size that fulfills the displaying characteristics; and providing a scrolling mechanism to view the visual representations of remaining channels of the plurality of channels.

15. The method of claim 1 further comprises refreshing the visual representations of the plurality of channels with more current data at a periodic rate.

16. A multiple channel display comprising:

a channel tuner;

a decoder operably coupled to receive broadcast signals from the channel tuner and to convert the broadcast signals into decoded representations;

a video graphics processing circuit operably coupled to the decoder, wherein the video graphics processing circuit generates pixel information from the decoder representations;

a digital storage medium that stores programming instructions that, when read by a processor within the video graphics processing circuit, cause the processor to prepare the pixel information for multiple channel display, the digital storage medium includes:

first means for storing programming instructions that, when read by the processor, causes the processor to retrieve identity of a plurality of channels;

second means for storing programming instructions that, when read by the processor, causes the processor to determine whether the plurality of channels can be displayed within a display area based on size of the display area, number of channels in the plurality of channels, and displaying characteristics;

third means for storing programming instructions that, when read by the processor, causes the processor to determine channel display size for each of the plurality of channels based on the displaying characteristics, the size of the display area, and the number of channels, when the plurality of channels can be displayed within the display area; and fourth means for storing programming instructions that, when read by the processor, causes the processor to provide the pixel information for visual representations of each of the plurality of channels in accordance with the channel display size such that the visual representations of each of the plurality of channels may be displayed on a single display.

17. A digital storage medium that stores programming instructions that, when read by a processor, cause the processor to prepare the pixel information for multiple channel display, the digital storage medium includes:

first means for storing programming instructions that, when read by the processor, causes the processor to retrieve identity of a plurality of channels;

second means for storing programming instructions that, when read by the processor, causes the processor to determine whether the plurality of channels can be displayed within a display area based on size of the display area, number of channels in the plurality of channels, and displaying characteristics;

third means for storing programming instructions that, when read by the processor, causes the processor to determine channel display size for each of the plurality of channels based on the displaying characteristics, the size of the display area, and the number of channels, when the plurality of channels can be displayed within the display area; and fourth means for storing programming instructions that, when read by the processor, causes the processor to provide the pixel information for visual representations of each of the plurality of channels in accordance with the channel display size such that the visual representations of each of the plurality of channels may be displayed on a single display.

18. A method for determining channel display areas for a plurality of channels, the method comprises the steps of
   a) determining a display area parameter that is based on at least one of width and height of the display area, wherein the display area is an area in which video representations of the plurality of channels are to be displayed;
   b) determining a channel display area parameter of a channel display area from the display area parameter and number of channels in the plurality of channels;
   c) determining height and width of the channel display area based on the channel display area parameter and an aspect ratio;
   d) comparing the height and width of the channel display area with minimal acceptable height and width values; and
   e) providing pixel information of the visual representations of the plurality of channels for display within the channel display areas when the comparing of the height and width of the channel display area with the minimal acceptable height and width values was favorable.

19. The method of claim 18 further comprises, within step (c), producing a width remainder and a height remainder and determining spacing between the channel display areas based on the width remainder and the height remainder.

20. A digital storage medium that stores programming instructions that, when read by a processor, causes the processor to determine size of a channel display area, the digital storage medium comprising:

first means for storing programming instructions that, when read by the processor, causes the processor to determine a display area parameter that is based on at least one of width and height of the display area, wherein the display area is an area in which video representations of the plurality of channels are to be displayed;

second means for storing programming instructions that, when read by the processor, causes the processor to determine a channel display area parameter of a channel display area from the display area parameter and number of channels in the plurality of channels;

third means for storing programming instructions that, when read by the processor, causes the processor to determine height and width of the channel display area based on the average channel display area and an aspect ratio;

fourth means for storing programming instructions that, when read by the processor, causes the processor to compare the height and width of the channel display area with minimal acceptable height and width values; and fifth means for storing programming instructions that, when read by the processor, causes the processor to provide pixel information of the visual representations of the plurality of channels for display within the channel display areas when the comparing of the height and width of the channel display area with the minimal acceptable height and width values was favorable.

* * * * *